US009055312B2

(12) United States Patent
Civanlar et al.

(10) Patent No.: US 9,055,312 B2
(45) Date of Patent: Jun. 9, 2015

(54) SYSTEM AND METHOD FOR INTERACTIVE SYNCHRONIZED VIDEO WATCHING

(75) Inventors: Reha Civanlar, Istanbul (TR); Ofer Shapiro, Fair Lawn, NJ (US); Isaac Levy, New York, NY (US); Tal Shalom, Fair Lawn, NJ (US)

(73) Assignee: Vidyo, Inc., Hackensack, NJ (US)

( * ) Notice: Subject to any disclaimer, the term of this patent is extended or adjusted under 35 U.S.C. 154(b) by 395 days.

(21) Appl. No.: 12/971,650

(22) Filed: Dec. 17, 2010

(65) Prior Publication Data

US 2011/0154417 A1   Jun. 23, 2011

Related U.S. Application Data

(60) Provisional application No. 61/289,249, filed on Dec. 22, 2009.

(51) Int. Cl.
| G06F 13/00 | (2006.01) |
| H04N 7/173 | (2011.01) |
| H04N 21/242 | (2011.01) |
| H04N 7/15 | (2006.01) |
| H04N 21/4223 | (2011.01) |
| H04N 21/431 | (2011.01) |
| H04N 21/4788 | (2011.01) |

(52) U.S. Cl.
CPC ............. *H04N 21/242* (2013.01); *H04N 7/15* (2013.01); *H04N 7/173* (2013.01); *H04N 21/4223* (2013.01); *H04N 21/4312* (2013.01); *H04N 21/4788* (2013.01)

(58) Field of Classification Search
None
See application file for complete search history.

(56) References Cited

U.S. PATENT DOCUMENTS

| 5,808,662 A * | 9/1998 | Kinney et al. ................. 348/14.1 |
| 6,188,428 B1 * | 2/2001 | Koz et al. ....................... 725/115 |
| 6,510,553 B1 * | 1/2003 | Hazra .............................. 725/87 |
| 6,519,771 B1 * | 2/2003 | Zenith ............................. 725/32 |
| 2001/0007150 A1 | 7/2001 | Santilli |
| 2002/0126201 A1 | 9/2002 | Schmitt et al. |

(Continued)

FOREIGN PATENT DOCUMENTS

| JP | 2002-185943 | 5/2002 |
| JP | 2009-055469 | 3/2009 |

OTHER PUBLICATIONS

International Search Report and Written Opinion—Application No. PCT/US2010/061094, International Filing Date: Dec. 17, 2010.

(Continued)

*Primary Examiner* — Jason K Lin
(74) *Attorney, Agent, or Firm* — Baker Botts, L.L.P.

(57) ABSTRACT

The present invention provides techniques for digital video distribution that provides for joint video content watching amongst a group of watchers using multiple mini browsing windows (MBWs), such that the watchers can simultaneously interact with each other in a video conferencing-like setting (i.e., seeing selected watchers' videos in MBWs and hearing their voices) while they view together specific video content in a synchronized way. The MBWs can be displayed as overlays on the main video window being watched on full screen.

12 Claims, 12 Drawing Sheets

(56) References Cited

U.S. PATENT DOCUMENTS

| | | | |
|---|---|---|---|
| 2003/0174202 A1 | 9/2003 | Eshkoli et al. | |
| 2003/0193559 A1* | 10/2003 | Fernandez et al. | 348/14.08 |
| 2004/0031063 A1 | 2/2004 | Satoda | |
| 2004/0119814 A1 | 6/2004 | Clisham et al. | |
| 2005/0033838 A1* | 2/2005 | Nisani et al. | 709/224 |
| 2007/0050822 A1* | 3/2007 | Stevens et al. | 725/74 |
| 2007/0143103 A1 | 6/2007 | Asthana et al. | |
| 2007/0160133 A1* | 7/2007 | Bao et al. | 375/240.1 |
| 2007/0206673 A1 | 9/2007 | Cipolli et al. | |
| 2007/0220575 A1* | 9/2007 | Cooper et al. | 725/118 |
| 2008/0136898 A1 | 6/2008 | Eisenberg et al. | |
| 2008/0158339 A1* | 7/2008 | Civanlar et al. | 348/14.09 |
| 2008/0231687 A1* | 9/2008 | Baird et al. | 348/14.09 |
| 2009/0044216 A1* | 2/2009 | McNicoll | 725/5 |
| 2009/0094651 A1 | 4/2009 | Damm et al. | |
| 2009/0167839 A1* | 7/2009 | Ottmar | 348/14.08 |

OTHER PUBLICATIONS

Atzori et al., "A Spatio-Temporal Concealment Technique Using Boundary Matching Algorithm and Mesh-Based Warping (BMA?MBW)", *IEEE Transactions on Multimedia*, vol. 3, No. 3 [Online] Sep. 2001. http://reference.kfupm.edu.sa/contents/s/p/a_spatio_temporal_concealment_technique_80120.pdf>.

Cobbley, "Multipoint LAN Conferencing", *Compcon Spring '93, Digest Papers*, San Francisco, CA Feb. 22-26, 1993, pp. 502-506 (1993).

Jiang, et al., "Performance Analysis of Application-level Multicast Routing Algorithms for Supporting Multipoint Interaction Synchronization", *IEEE Latin-American Conference, Latincom '09*, pp. 1-6 (2009).

Keuchler, et al., "HoloPort—A Device for Simultaneous Video and Data Conferencing Featuring Gaze Awareness", *IEEE Virtual Reality '06*, pp. 81-88 (2006).

* cited by examiner

SYSTEM AND METHOD FOR INTERACTIVE SYNCHRONIZED VIDEO WATCHING

CROSS-REFERENCE TO RELATED APPLICATIONS

This application claims the benefit of priority to U.S. Provisional Application Ser. No. 61/289,249, filed Dec. 22, 2009, which is hereby incorporated by reference herein in its entirety.

BACKGROUND

1. Technical Field

The present invention relates to compressed digital video delivery systems such as cable TV (CATV), satellite TV, Internet protocol TV (IPTV) and the Internet based video distribution systems. In particular, it relates to the use of a low-delay and layered codec and the corresponding low-delay transport, typically used for videoconferencing systems. The disclosed digital video delivery system allow a group of watchers to watch one or several selected video content in such a way that the video is synchronously displayed regardless of location and network bandwidth.

2. Background Art

Subject matter related to the present application can be found in U.S. patent application Ser. No. 12/015,956, filed and entitled "SYSTEM AND METHOD FOR SCALABLE AND LOW-DELAY VIDEOCONFERENCING USING SCALABLE VIDEO CODING," Ser. No. 11/608,776, filed and entitled "SYSTEMS AND METHODS FOR ERROR RESILIENCE AND RANDOM ACCESS IN VIDEO COMMUNICATION SYSTEMS," Ser. No. 11/682,263, filed and entitled "SYSTEM AND METHOD FOR PROVIDING ERROR RESILIENCE, RANDOM ACCESS AND RATE CONTROL IN SCALABLE VIDEO COMMUNICATIONS," 61/172,355, filed and entitled "SYSTEM AND METHOD FOR INSTANT MULTI-CHANNEL VIDEO CONTENT BROWSING IN DIGITAL VIDEO DISTRIBUTION SYSTEMS," Ser. No. 11/865,478, filed and entitled "SYSTEM AND METHOD FOR MULTIPOINT CONFERENCING WITH SCALABLE VIDEO CODING SERVERS AND MULTICAST," Ser. No. 11/615,643, filed and entitled "SYSTEM AND METHOD FOR VIDEOCONFEFERENCING USING SCALABLE VIDEO CODING AND COMPOSITING SCALABLE VIDEO SERVERS," and co-pending provisional U.S. Patent Application Ser. No. 61/060,072, filed and entitled "SYSTEM AND METHOD FOR IMPROVED VIEW LAYOUT MANAGEMENT IN SCALABLE VIDEO AND AUDIO COMMUNICATION SYSTEMS", as well as U.S. Pat. No. 7,593,032, filed and entitled "SYSTEM AND METHOD FOR A CONFERENCE SERVER ARCHITECTURE FOR LOW DELAY AND DISTRIBUTED CONFERENCING APPLICATIONS,". All of the aforementioned related applications and patents are hereby incorporated by reference herein in their entireties.

There are many applications where a group of people would like to participate or collaborate while watching live or video content. A few of these are as follows:

Sports events: Sports fans visit large stadiums or sports bars not only to watch a game, but also to share with their buddies heart rendering excitement, cheer together when their team scores, and share viewpoints during the game.

Education: Many schools have conference rooms from where the school can multicast a lecture to students. Some hospitals have capabilities to show every step of a surgery live to an audience. The students or the doctors may want to watch the lecture or surgery together so that they can share their viewpoints while watching the content remotely.

Gaming: Many TV game shows provide means for interaction with the audience through concepts such as "lifeline" or "helpline," or simply asking the audience to vote on a specific question or scene. There are also gaming applications where the TV station may want to show remote players or the remote players may want to see one another and chat about the game while playing it.

Corporate Announcements: There may be company meetings, corporate announcements, customer presentations, etc., where a group of participants may want to share viewpoints while watching the corporate announcement.

News and Journalism: News events from all around the world seldom turn into the "talk of the day." Many of the news events are of public interest. People would like to discuss, debate, and respond within groups while watching the news.

One can generate many other examples—e.g., fashion shows, family events, etc.—where a group collaborates over specific video content in real-time. Novel techniques which employ a low-delay and layered codec and its associated low-delay transport are described in co-pending U.S. patent application Ser. Nos. 12/015,956, 11/608,776, and 11/682, 263, as well as U.S. Pat. No. 7,593,032.

In digital video codecs, alternatively known as digital video coding/decoding techniques (e.g., MPEG-2, H.263 or H.264, and packet network delivery), varying transport delays are introduced at each receiver, preventing synchronous play-back in a multicasting or broadcasting system based on these technologies. These delays are caused by: (a) network delays due to varying route lengths between source and receiver, and (b) delays resulting from buffering by the decoder at the receiving end, which is necessary to alleviate the effects of: (i) delay jitter caused by varying queuing delays in transport network routers; (ii) packet losses in the network; and/or (iii) bandwidth changes in the transport network (such as variable link bandwidths experienced in wireless networks).

IPTV and other packet network based video distribution systems suffer from both network delays and buffering delays. In the evolving IPTV environment, particularly where video is delivered over a best effort network such as the public Internet, where the network conditions are totally unpredictable, these delays can be significant (for example, up to a few tens of a second). Depending on the location of each receiver in reference to the video source, the delay variation component due to network conditions can be significant, and each receiver can receive the same video frame at a different time.

The source video synchronized conferencing system of the present invention has two overlaid architectures, each with different requirements:

(1) Synchronous Video Distribution: A video source sends specific video content to a group of users (one-way) such that each user can watch exactly the same video at the same time. This system requires "delay equalization," although there is no strict delay limitation.

(2) Multipoint Video Conferencing: A group of users can interact with each other (two-ways) using a multipoint video conferencing system. This system requires strict "delay control," since interactions must take place in real-time, requiring strict delay bounds.

While it is possible to overlay a traditional streaming based video distribution system with a typical conferencing system to approximate the system disclosed in this invention, this type of an overlay cannot control delay to achieve the required synchronized watching.

Network delay equalization to achieve synchronicity can be done by employing different methods:

(1) Maximum Delay Based Equalization: This method employs an out of band control layer, which measures the delay between the video source and each receiver in the group, and adjusts each receiver's display time according to the maximum delay. This method requires the measurement of all delays and a means for determining and distributing the value of the maximum delay to all participants throughout the session, because: (a) changing network conditions may result in changing delays as the video is being delivered, and (b) there may be new users with varying delays added to the group.

(2) Longest Route Delay Based Equalization: With this technique, the video source sends the same video to each receiver, but along network routes that give essentially the same amount of delay (if there are multiple routes available for each receiver). For example, when the video source is in New York, and there are two users in New York and two users in California, the computation of route lengths results in serving the users in New York using a longer route, for example, through Atlanta and back to New York, to attain the same geographical distance between the video source in New York and users in both New York and California. This method may not be practical where no such equalizing routes are available. Even where such routes are available, the system uses the network inefficiently by selecting long routes for receivers that are closer to the video source, and it is very difficult, if not impossible, to deal with path delay variations.

Although the above described methods or similar techniques can be used to equalize the network delay in a streaming based video distribution system, receiver side buffering delay can be even more significant. The decoder of a streaming system relies on buffering at the receiver as a mechanism for error resilience. Network-triggered error conditions can occur due to congestion, even when transport delays are equalized or non-existent. Buffering at the receiver due to retransmission of lost packets causes insurmountable delay variations, as described in co-pending U.S. patent application Ser. Nos. 11/608,776 and 11/682,263. Although the largest receiver buffer size can be communicated to all receivers (similar to maximum network delay based equalization) so that each receiver delays its display until the receiver with the largest buffer can display the video, none of these systems can be used for live interaction among video watchers.

In order to eliminate the buffering delays at the receiver, the present invention uses a video conferencing system for the aforementioned video distribution system instead of a streaming system. However, given that transport delays are usually the biggest component of delay, a generic video teleconferencing codec does not alleviate the delay problems altogether. Therefore, the present invention uses the low-delay layered codec and its corresponding low-transport delay system, described in co-pending U.S. patent application Ser. Nos. 12/015,956, 11/608,776, and 11/682,263, as well as U.S. Pat. No. 7,593,032, which generates multiple layers of video and protects the vital base layer only. These techniques eliminate the need for any buffering at the receiver by introducing slight performance degradation in the event of packet loss or excessive packet delay. In addition, layered codec instantly generates synchronization frames without any need for future frames. The same system is employed for the multipoint video conferencing as well.

Traditional video codecs, such as H.261, H.263 (used in videoconferencing) or MPEG-1 and MPEG-2 Main Profile (used in Video CDs and DVDs, respectively), are designed to provide a single bitstream at a given bitrate. Although some video codecs are designed without rate control, thus resulting in a variable bit rate stream (e.g., MPEG-2), video codecs used for communication purposes establish a target operating bitrate depending on the specific infrastructure. These designs assume that the network is able to provide a constant bitrate due to a practically error-free channel between the video source and the receiver. The H-series codecs, designed specifically for person-to-person communication applications, offer some additional features to increase robustness in the presence of channel errors, but are still only tolerant to a very small percentage of packet losses (for example, 2-3%).

A limitation of single layer coding exists where a lower spatial resolution is required, such as a smaller frame size. The full resolution signal must be sent and decoded at the receiving end, thus wasting bandwidth and computational resources, with downscaling performed at the receiver or at a network device. However, support for lower resolutions is essential in the overlay video conferencing application, as one goal is to fit as many users and mini browsing windows (MBWs) as possible into a specific screen area, which are naturally of lower resolution than the main video program.

Layered codec, alternatively known as layered coding or scalable codecs/coding, is a video compression technique that has been developed explicitly for heterogeneous environments. In such codecs, two or more layers are generated for a given source video signal: a base layer and at least one enhancement layer. The base layer offers a basic representation of the source signal at a reduced quality, which can be achieved, for example, by reducing the Signal-to-Noise Ratio (SNR) through coarse quantization, using a reduced spatial and/or temporal resolution, or a combination of these techniques. The base layer can be transmitted using a reliable channel, i.e., a channel with guaranteed or enhanced Quality of Service (QoS). Each enhancement layer increases the quality by increasing the SNR, spatial resolution, or temporal resolution, and can be transmitted with reduced or no QoS. In effect, a user is guaranteed to receive a signal with at least a minimum level of quality of the base layer signal.

Another objective of using layered coding in synchronized viewing is to offer a personalized view or layout on each video display (i.e., each receiver may display different numbers and sizes of MBWs); and rate matching (i.e., each receiver can use IP network connections with different bandwidths and can need to receive different data rates).

In a layered video coding architecture, the source video (for example, a football game playing on a TV channel) and the receivers in the group transmit a layered bitstream (base layer plus one or more enhancement layers) using a corresponding number of physical or virtual channels on the network, such as the public Internet. The base layer channel is assumed to offer higher QoS, whereas the enhancement stream channels offer lower or even no QoS. This architecture ensures the base layer always arrive at the decoder with almost no loss.

Losses in the enhancement streams will result in a graceful degradation of picture quality. The encoder accordingly selects the correct amount and type of information that is required based on user preference information, such as number or size of MB Ws, or properties of the receiver, such as available bandwidth, and forwards only that information to the user's receiver. Little or no signal processing is required of the layered encoder in this respect; the layered encoder simply reads the packet headers of the incoming data and selectively forwards the appropriate packets to each user. The various incoming packets are aggregated to two or more channels (for each MBW), and base layer packets are transmitted over the high reliability channel.

If a user elects to enlarge one MBW to the main screen (to view the video in large size), the main video program can be swapped to an MBW. As a result, only the base layer of the video content is sent and displayed at that MBW.

The use of the layered codec can eliminate the need to decode and re-encode the video on the encoder side or at network devices (e.g., multipoint control units) to generate different special/temporal patterns for each user, and therefore provides no algorithmic delay. Most significantly, the computational requirements on the encoder are reduced greatly.

The use of a conferencing system can imply use of a Scalable Video Conferencing Switch (SVCS) to achieve the effects of multipoint conferencing and the utility of sending only the base layer or the base layer and one or more enhancement layers based on user MBW preferences and network capabilities.

IPTV video distribution to a large number of receivers using streaming technology is well understood in the prior art. Although SVCS-based video conferencing can be used to distribute the source video to receivers, it is worthwhile to mention the typical video distribution techniques for streaming video. There are two key approaches: (1) Application Layer Multicasting, as described in Suman Banerjee, Bobby Bhattacharjee and Christopher Kommareddy, "Scalable application layer multicast," ACM SIGCOMM Computer Communication Review, Volume 32, Issue 4 (October 2002), is performed above the IP layer; and (2) IP layer multicasting is performed by the IP network.

Application Layer Multicasting can be implemented using Content Distribution Networks (CDN) where the content of the video source is replicated and cached at a downstream server closer to clusters of receivers to minimize the amount of network traffic. Other types of systems can use receivers to propagate the video as in peer-to-peer (P2P) implementations. Many variants of CDNs and associated services are commercially available in the market.

IP Multicast is another well-known technique for many-to-many communications over an IP infrastructure, as described in "IP Multicast Applications: Challenges & Solutions," RFC 3170, IETF, http://www.ietf.org/rfc/rfc3170.txt and co-pending U.S. patent application Ser. No. 11/865,478. IP Multicast efficiently uses IP network infrastructure by requiring the source to send a packet only once, even if the packet needs to be delivered to a large number of receivers. The nodes in the network replicate the packet for delivery to multiple receivers only where necessary. Key concepts in IP Multicast include an IP Multicast group address, a multicast distribution tree, and receiver driven tree creation.

An IP Multicast group address is used by video sources and receivers to send and receive content. A source uses the group address as the IP destination address in their data packets. A receiver uses the group address to inform the network that it is interested in receiving packets sent to that group address. For example, if video content is associated with group 239.1.1.1, the source will send data packets destined for 239.1.1.1. Receivers for that content will inform the network that they are interested in receiving data packets sent to the group 239.1.1.1. The receiver "joins" 239.1.1.1.

Once the receivers join a particular IP Multicast group, a multicast distribution tree is constructed for that group. The protocol most widely used for this is Protocol Independent Multicast (PIM). PIM sets up multicast distribution trees such that a data packet from a sender to a multicast group reaches all receivers that have "joined" the group. There are many different flavors of PIM: Sparse Mode (SM), Dense Mode (DM), Source Specific Mode (SSM) and Bidirectional Mode (Bidir).

The distribution of video content in a massively scalable video conferencing session where there is only one video source (or few video sources) and a very large number of receivers (who do not send any video) can utilize a single SVCS, a distributed SVCS, or a plurality of cascaded SVCSs, as described in co-pending U.S. patent application Ser. No. 11/615,643 and U.S. Pat. No. 7,593,032. Unless otherwise noted, henceforth, the term "SVCS" refers to any of single, distributed, or cascaded SVCS.

SUMMARY

The present invention provides techniques for digital video distribution that provides for joint video content watching amongst a group of watchers using multiple mini browsing windows (MBWs), such that the watchers can simultaneously interact with each other in a video conferencing-like setting (i.e., seeing selected watchers' videos in MBWs and hearing their voices) while they view together specific video content in a synchronized way. The MBWs can be displayed as overlays on the main video window being watched on full screen.

The present invention provides techniques for sending video content (e.g., a football game) in a synchronized way to all watchers' video displays (i.e., every watcher sees the same frame at virtually the same time for all practical purposes), and simultaneously enable video interaction between two or more watchers (e.g., football fans) using overlay MBWs described in co-pending U.S. patent application Ser. No. 61/172,355. The system achieves synchronization of video content and parallel video conferencing by removing the buffering and encoding delays occurring with typical streaming based systems that distribute video content in real-time.

While a classical digital video distribution system delivers full resolution video, the present invention uses the layered real-time codec. The video content displayed in the overlaid MBWs can use the lower layer(s) of the low delay and layered codec (representing lower resolutions, lower frame rate or lower signal to noise ratio) using much less bandwidth and enabling a low processing complexity, while the jointly watched video content can be delivered in full resolution but with low delay.

BRIEF DESCRIPTION OF THE DRAWINGS

FIG. 4a-1 is a flow diagram illustrating a method in accordance with an exemplary embodiment of the present invention.

FIG. 4b-1 is a flow diagram illustrating a method in accordance with an exemplary embodiment of the present invention.

DETAILED DESCRIPTION

Figure 1:
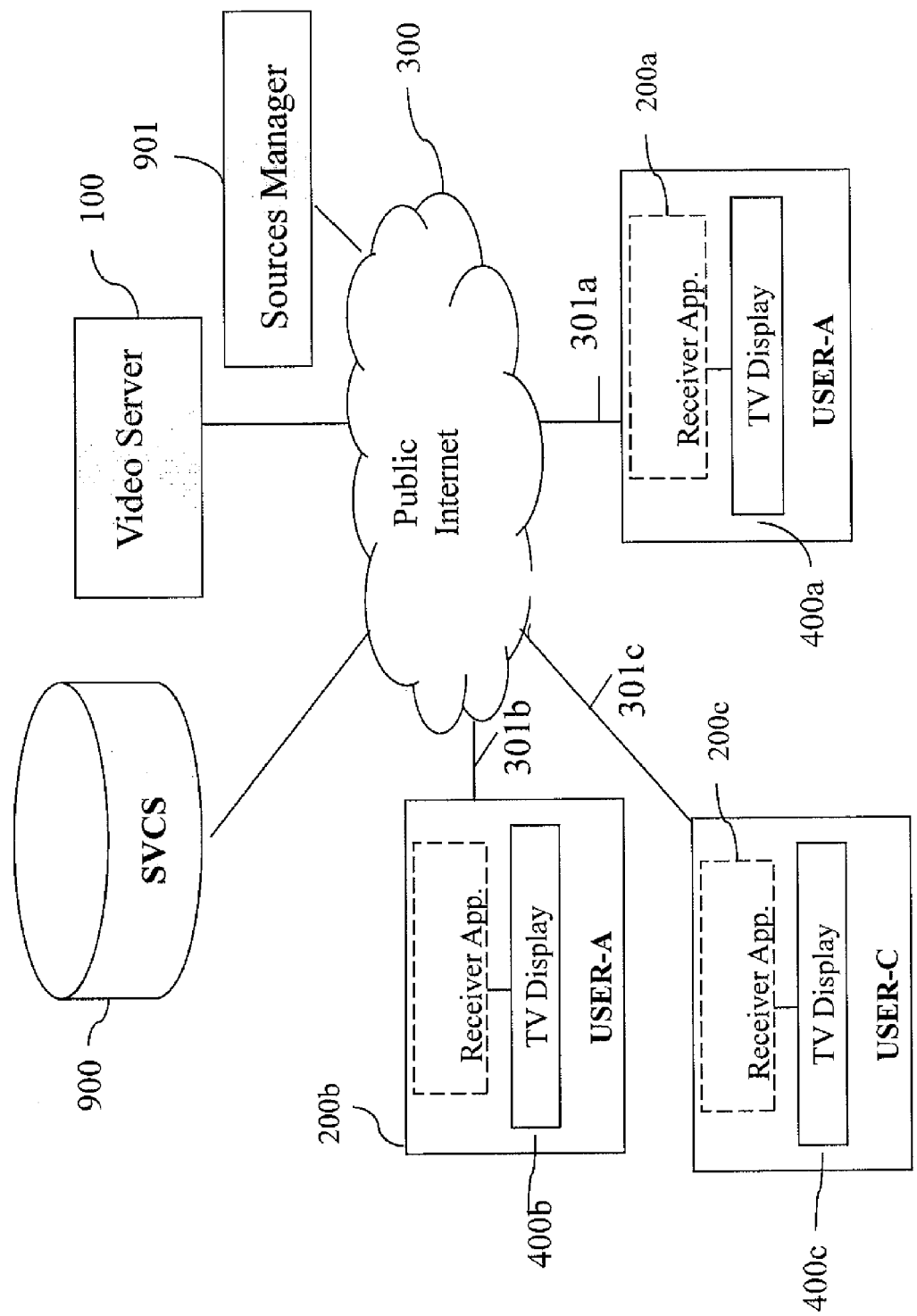
FIG. 1 is a block diagram illustrating an exemplary system for video conferencing in accordance with an exemplary embodiment of the present invention.

FIG. 1 illustrates an exemplary system for interactive synchronized video watching using a video server and an overlay conferencing system. The system comprises a video server 100, which contains one or more physical servers, located at the IPTV provider's network, the receiver application 200a, 200b or 200c at each TV user's location, alternatively known as the user or client, and public Internet 300, interconnecting video server 100 to receiving application 200a, 200b or 200c. While the network illustrated in FIG. 1 is the Public Internet 300, the present invention also envisions that the video server 100 and receiving application 200a, 200b or 200c can communicate over another network, for example, another IP network, a packet network, a combination of a private IP network and public Internet, or a private network, depending on the service provider's network architecture choice.

In an exemplary embodiment for interactive synchronized video watching, the system has one user group (including, for example, users A, B, and C with receiver applications 200a, 200b, and 200c, respectively) jointly watching video content transmitted by the video server 100. The scalable video conferencing switch (SVCS) 900 is the multipoint conferencing unit, as described in co-pending U.S. patent application Ser. Nos. 12/015,956, 11/608,776, 11/682,263, and 11/615,643, as well as U.S. Pat. No. 7,593,032. The SVCS enables video conferencing between users A, B, and C. The sources manager 901 handles assignment of video sources in the network to user groups. Receiver applications 200a, 200b, and 200c are connected to public Internet 300 via links 301a, 301b, and 301c, respectively. These links 301a, 301b, and 301c carry four types of traffic:

(1) video content from video server 100 through the SVCS 900;

(2) conferencing content between receiver applications 200a, 200b, and 200c through SVCS 900;

(3) MBW control logic messages between MBW user control clients residing in receiver applications 200a, 200b, and 200c and the MBW control server residing in video server 100 (exemplary messages are described as the "Channel Subscribe Request," "Channel Subscribe Response," "Channel Unsubscribe Request," and "Channel Unsubscribe Response" messages in co-pending U.S. Patent Application Ser. No. 61/172,355); and/or (4) real-time transport protocol (RTP) packets for video content and video conferencing media transport, signaling protocol (e.g., session initiation protocol (SIP)) for session management for video conferencing, and/or real time streaming protocol (RTSP) or hypertext transfer protocol (HTTP) for video content control.

While the system illustrated in FIG. 1 contains a single video server 100 collocated with a single SVCS 900 (the SVCS video distribution network can include more than one interconnected SVCS operating in a coordinated manner as described in co-pending U.S. patent application Ser. Nos. 12/015,945 and 11/615,643), the present invention envisions that the video server 100 and SVCS 900 can be located in different offices.

An exemplary receiver application 200a, 200b, or 200c can reside, for example, in a user's TV, personal computer, or other type of computer (e.g., an IPTV set-top box or game console). The TV or personal computer hosting the receiver application 200a, 200h, or 200c is attached to a video display 400a, 400b, or 400c, respectively, which can be a TV or computer monitor.

Figure 2:
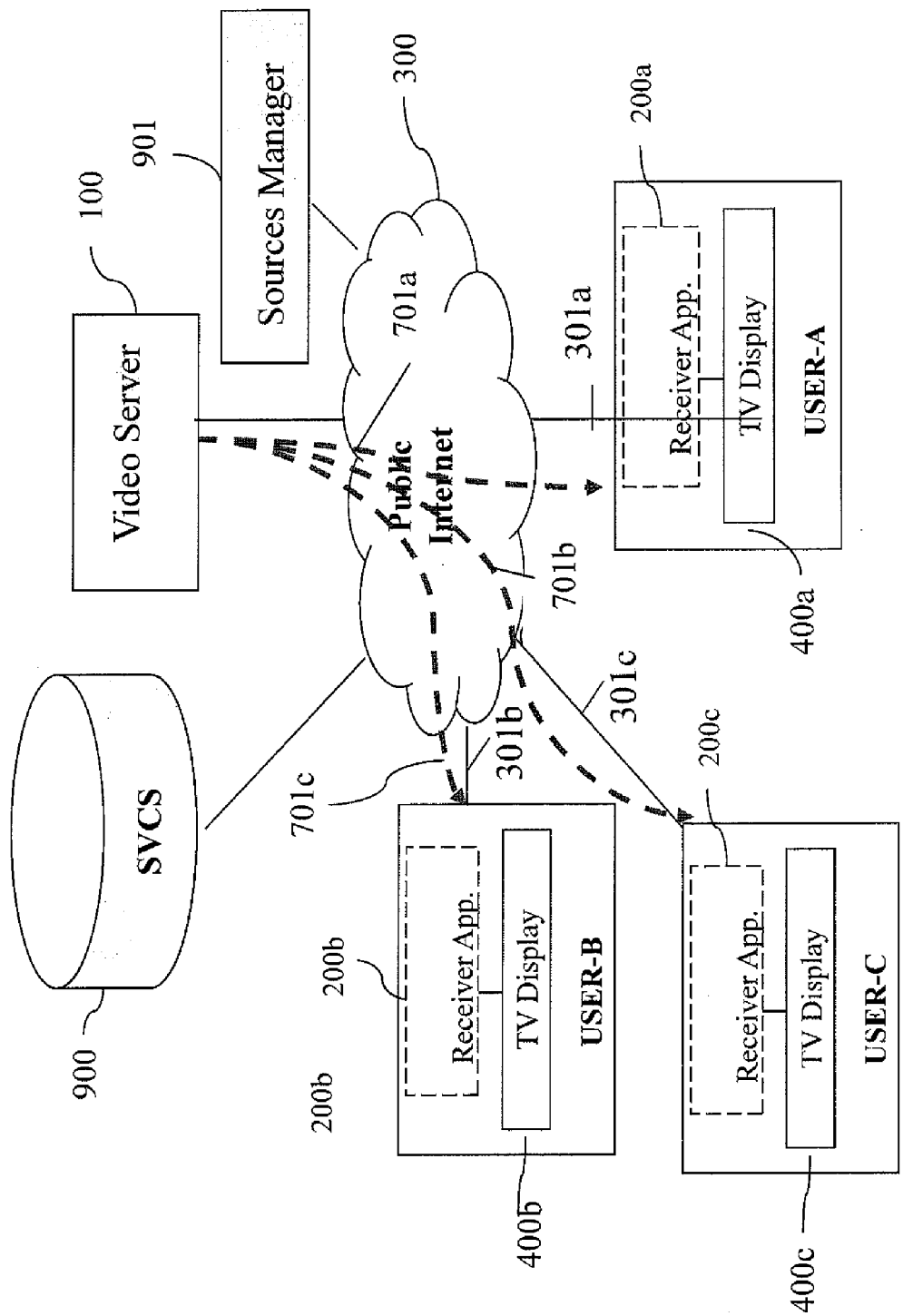
FIG. 2 is a block diagram illustrating an exemplary system for synchronized video distribution in accordance with an exemplary embodiment of the present invention.

FIG. 2 illustrates an exemplary system for interactive synchronized video watching where a group of users elects to watch a synchronized video session. The video server 100 sends video content (for example, a video program or TV channel) to users in a user group using links 701a, 701b, and 701c. The video content has been encoded using the low-delay and layered codec to ensure buffering delays are eliminated. If there are significant network delay differences between each user and the video server because of the user locations, then the video server 100 can exercise the additional logic to determine the network delays and provide equalization of delays. An exemplary logic component can be, for example, a well-established delay measurement software component that runs in the video server 100. Links 701a, 701b, and 701c carry the following:

(1) RTP to transport the video content;

(2) RTSP or HTTP to transport MBW control logic messages (for example, to swap the main window with an MBW when the users elect to conference and put the video content to a background MBW); and/or (3) another application layer protocol (for example, protocols described by the Internet Protocol Performance Metrics (IPPM) working group of the Internet Engineering Task Force (IETF)), which measures and reports on measured network delay to determine if delay equalization is needed.

Figure 3:
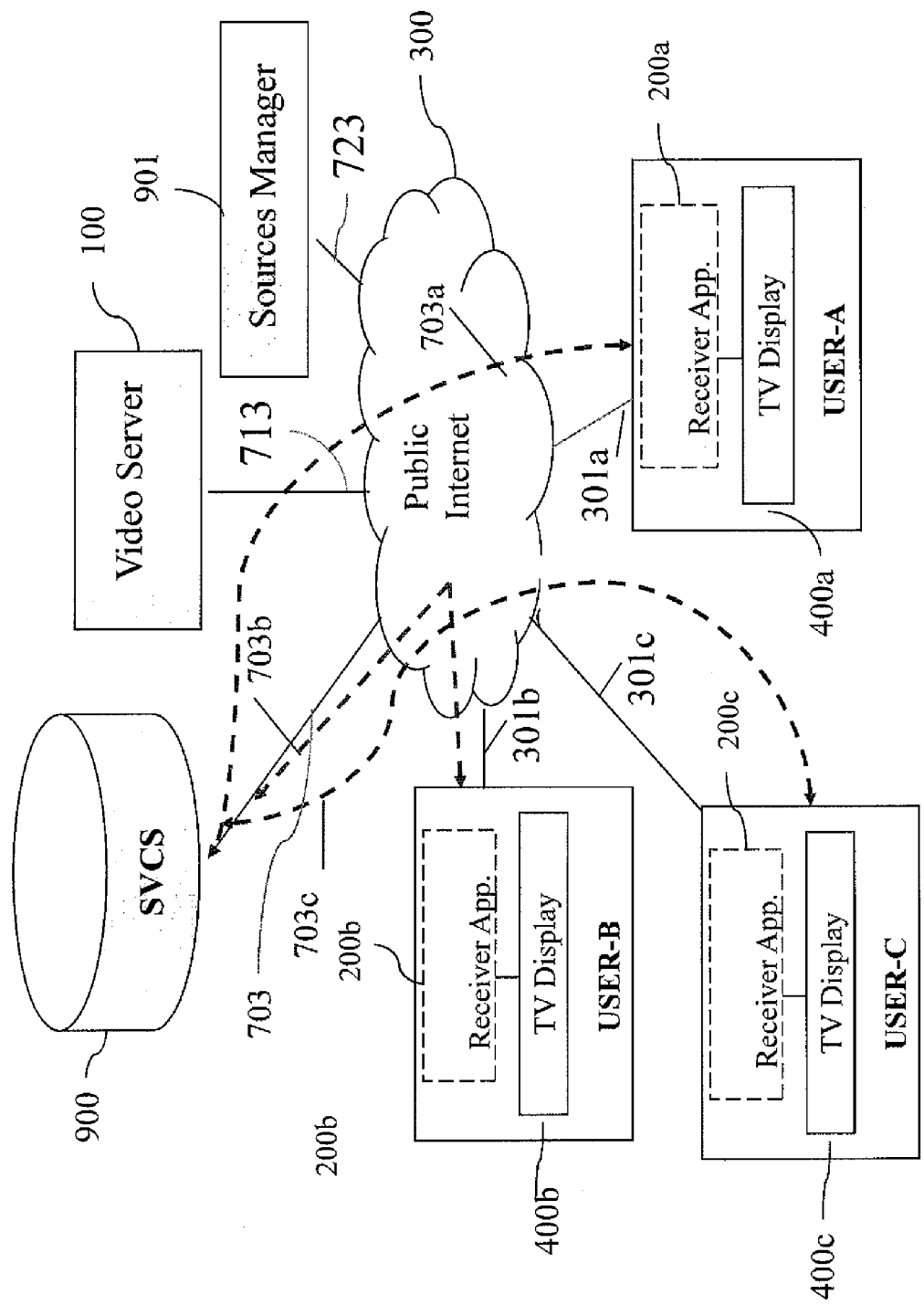
FIG. 3 is a block diagram illustrating an exemplary system for video conferencing in accordance with an exemplary embodiment of the present invention.

FIG. 3 illustrates an exemplary system for interactive synchronized video watching. SVCS 900 and receiver applications 200a, 200b, and 200c form a conference using layered low delay codec, as described in co-pending U.S. patent application Ser. Nos. 12/015,956, 11/608,776, and 11/682,263, as well as U.S. Pat. No. 7,593,032. Links 703a, 703b, and 703c carry:

(1) a protocol (e.g., SIP) for session initiation and session control;

(2) RTP for conferencing content; and/or (3) RTSP, HTTP or another protocol for MBW control logic messages (for example, to control the video source and change the MBW window sizes).

A protocol such as SIP can also be used between the video server 100 and the receiver applications 200a, 200b, and 200c in the user group when the user group initiates a synchronized watching session. More specifically, the video server 100 becomes a special "one-way user" in the group, which transmits video content to everyone in the group, but does not receive any of the conferencing content from the users. The remaining users (i.e., receiver applications 200a, 200b, and 200c) are "two-way" users; they can send and receive content to/from each other.

FIGS. 4a through 4e are exemplary systems for interactive synchronized video watching that focus on SVCS based video distribution and conference handling. In principal, two types of conferences can be considered in a synchronized viewing session. First, a video-distribution conference (VDC) distributes the video content from the source (e.g., a football game) to all recipients requesting it. In a VDC, there is typically only one video source and many receivers. However, there can be more than one source (e.g., multiple channels) watched synchronously by many receivers. This case can be covered by considering multiple VDCs. Second, a co-view conference (CVC) is the conference between a subset of VDC receivers. In a CVC, the participants both send and receive video and audio.

Figure 4A:
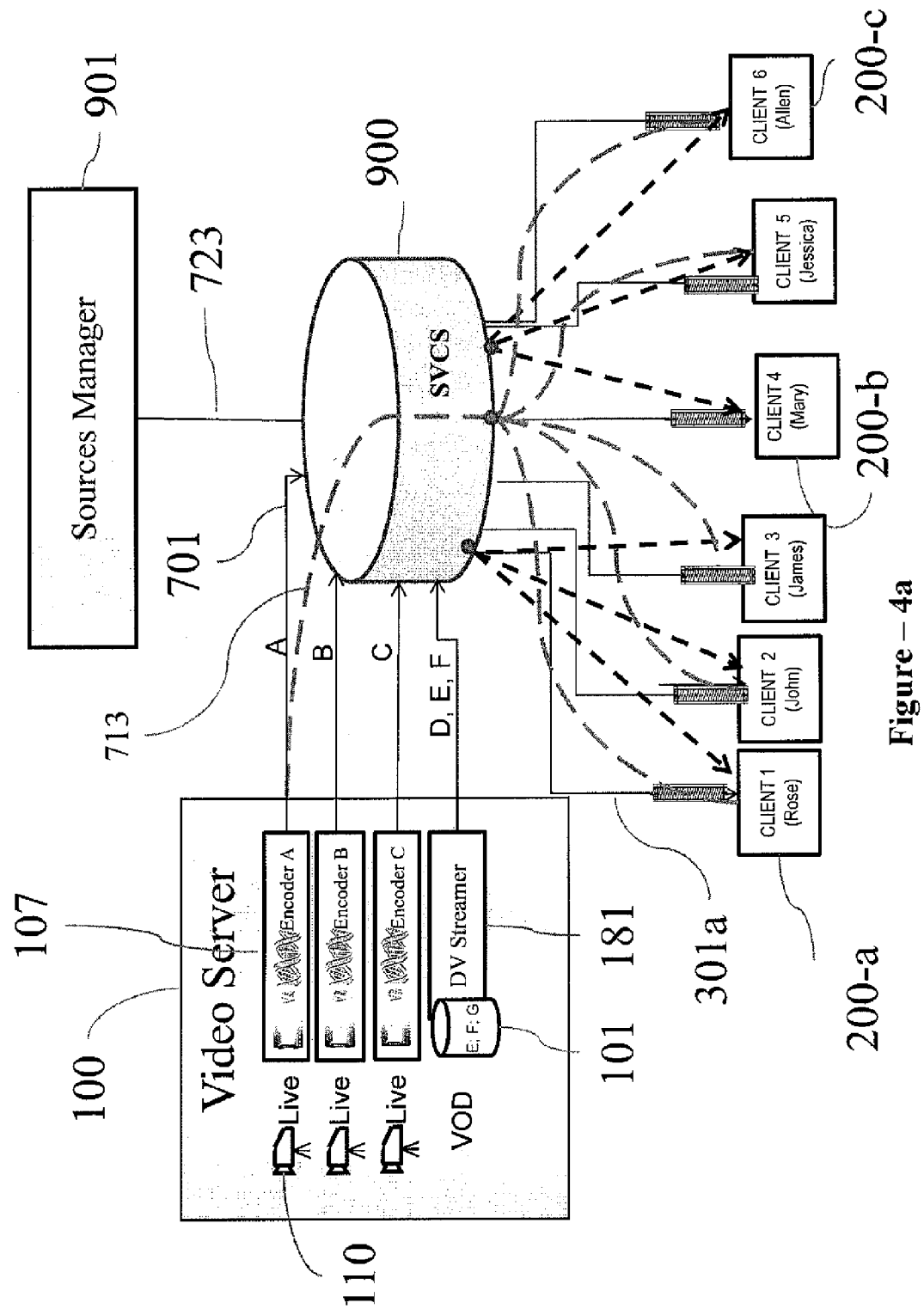
FIG. 4a is a network diagram illustrating an exemplary system for video distribution and video conferencing in accordance with an exemplary embodiment of the present invention.
Figures 1, 4A:
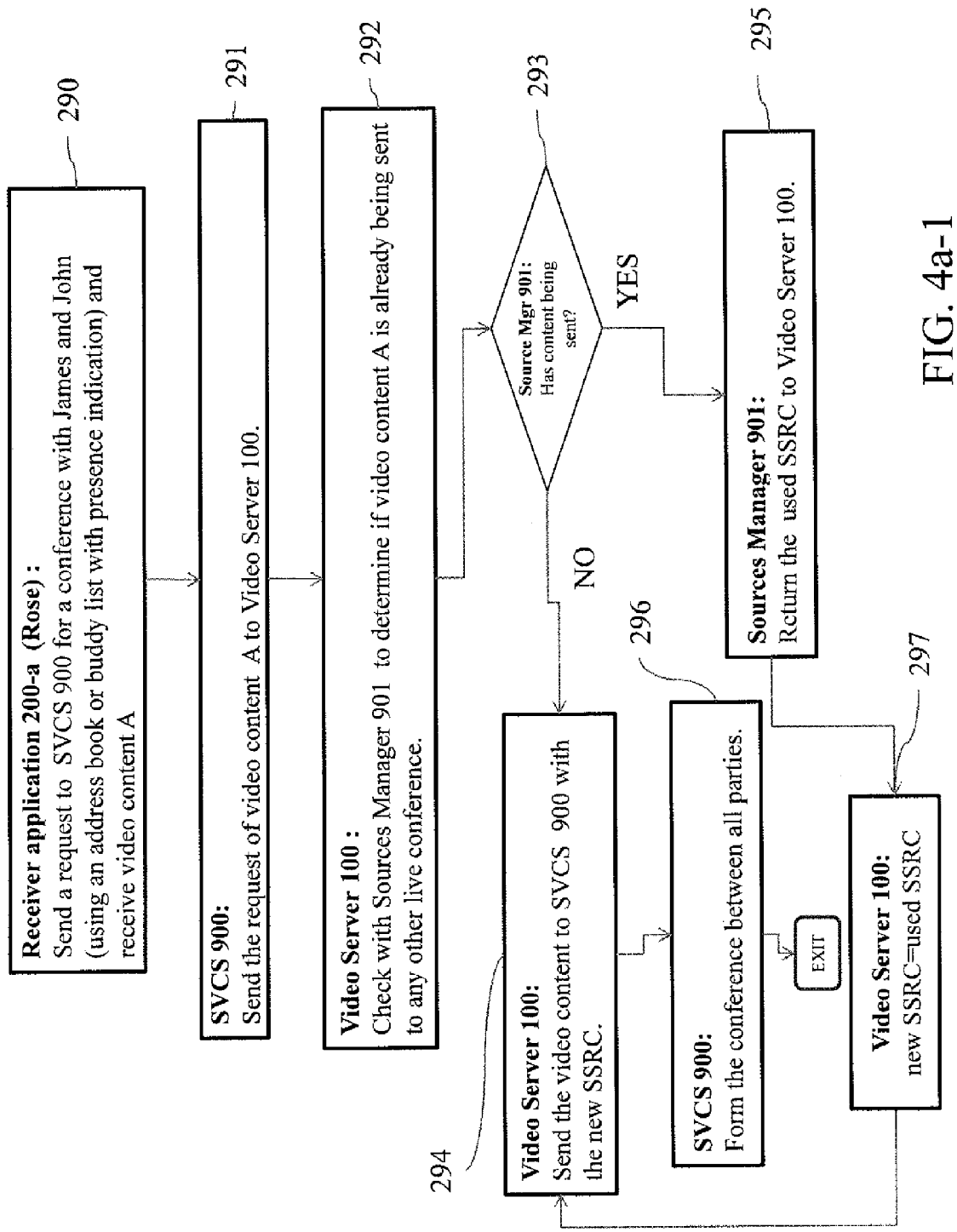

FIG. 4a illustrates an exemplary system for interactive synchronized video watching where VDC(s) and one or more CVCs are combined to form a single conference, referred to as "one big conference." In this diagram, the video server 100 is comprised of a camera 110 to record live video, a layered encoder 107 to encode the video recorded by camera 110, a video database 101 to store prerecorded video for services such as VoD, and a digital video (DV) streamer 181 to stream the video from the video database 101. The video server 100 is connected to SVCS 900 through the public Internet, another IP network, a packet network, a combination of a private IP network and public Internet, or a private network (not pictured) using link 701. The sources manager 901 connects to SVCS 900 through a link 723 that can be the public Internet or a private IP network (not pictured). Client 1 is connected to the network through receiver application 200-a, described in FIG. 1. Similarly, client 4 is connected through receiver application 200-b and client 5 through receiver application 200-c. Note that the receiver applications 200-a, 200-b, and 200-c can also be connected to SVCS 900 through the same the public Internet, IP network, packet network, combination of a private IP network and public Internet, or private network connecting the source manager 901 and video server 100 to the SVCS 900, or through another private IP network, using link 301-a. The video server 100 sends video content A through flow 713 through link 701 to SVCS 900, which in turn sends video content to receiver applications of clients 1 through 5 as shown. Clients 1 through 5 are referred to as follows: Rose, John, James, Mary, Jessica, and Allen, respectively. For example, consider a group of clients (Rose, John, James, Jessica, and Allen) who want to interact via video conference while watching video content A (e.g., a TV channel featuring football games) sent by the video server 100. Rose asks for the football channel along with a request to conference with John and James. Simultaneous to Rose's conference, Mary asks to receive the same football channel along with a live conference with Allen and Jessica (but not Mary, John, and James). (Football Channel, VDC), (Rose, John and James, say CVC1), and (Mary, Allen and Jessica, say CVC2) are all part of the same Football Channel Conference where everyone watching the channel is actually on the same conference although the co-view conferences are virtually disjoint.

In the "one big conference" embodiment, the media can be distributed to the receivers in an efficient manner using a single SVCs or an SVCS network. Receivers can request any number of sources, for example, live, on demand, and/or communication sources. When multiple sources (e.g., channels) are added to a large conference, each channel is routed only to those receivers who want to watch the channel in a regular multipoint conference. If more than one SVCS is in use, then the media streams from these sources can be sent to the receiver from the localized (i.e., nearest) SVCS in the cloud, advantageously in a single "trunk".

A problem with the "one big conference" embodiment is that the conference session signaling and feedback messages must be sent in such a way that signaling messages pertaining to each CVC must stay only within that CVC (and not get transmitted to other CVCs), while the signaling messages pertaining to the source videos must be distributed to all receivers. This requires employing a non-standard conference signaling protocol because, otherwise, as the number of receivers increases, the corresponding number of signaling messages becomes extremely large, making the solution non-scalable. Furthermore, this solution can have a security problem as any receiver can join any CVC easily since all CVCs are, in essence, part of "one big conference."

In another exemplary embodiment, each group of users forms a CVC disjoint from the others and the video sources become members of these CVCs, referred to as "multiple small conferences." In this conferencing system, a video source must be able to participate in more than one conference simultaneously. The session signaling is constrained to small CVCs, and therefore can scale to large numbers of users. However, unless a special arrangement is in place, the source videos cannot be distributed efficiently when more than one SVCS is involved, because SVCSs can be required to transmit the same video for different CVCs several times over the same link.

This inefficient video distribution problem can be resolved by modifying the standard source identification method. Following the "one big conference" example discussed above, when Rose asks for conference CDC1 and the football channel, the video source joining the conference can be indexed by the sources manager, which specifies the video source by a globally unique source identifier, for example, using the synchronization source (SSRC) field of the RTP header that carries the video content. Normally, when Mary asks for another conference CRC2 with the same football channel, the same source joining Mary's conference will be indexed and specified using a different SSRC. However, to achieve efficient distribution, these conferences should be treated as one. For this purpose, the SSRC field (e.g., for the same football channel) must be the same across all CRCs requesting it, which can be achieved by using specialized processing at the sources manager and the source transmitters.

In a preferred embodiment of the present invention, when each new CRC is formed and requests a video source, the sources manager determines whether that specific source has already been requested by another conference. If so, the same SSRC will be assigned to the source. Thus, the SVCS do not treat the same packet from the video source as a new packet for each conference. By assigning the same SSRC, the source video content can be sent only once to any downstream SVCS.

FIG. 4a-1 illustrates an exemplary method for interactive synchronized TV watching using the exemplary network architecture illustrated in FIG. 4a. The process starts when receiver application 200-a (i.e., client 1, "Rose") requests 290 to form a CVC between herself, John, and James, and receive video content A (e.g., a football game). Receiver application 200-a, in turn, sends 291 the request to SVCS-VDN (Video Distribution Network) 900 to form a conference between the video content A and Rose, John, and James. SVCS-900 sends 292 the request to the video server 100. The video server 100 in turn sends 293 a message to the sources manager 901 to check whether the video content A is already being sent to any other conferences.

If the video is already being sent to another conference, the sources manager 901 returns 295 the SSRC value already being used to the video server 100. The video server 100 then sends 294 the video content A with that SSRC value to SVCS-VDN 900 so that only one copy of the video is sent downstream.

If the sources manager 901 determines 297 that the video content A is not being sent, a new SSRC is created 294 by the video server 100 and the video content A is sent 296 to SVCS 900.

FIG. 4.*b* illustrates another exemplary system for providing interactive synchronized video watching, referred to as "two conferences," which combines the advantages of the two approaches described above. In an exemplary embodiment, there are two SVCSs which can be co-located or distributed. SVCS-VDN 900 manages the video content distribution to clients, and SVCS-CVCs 910-1 and 910-2 manage the video conference sessions between groups of clients. Two instances of SVCS-CVCs are shown to illustrate that a group of clients can have one or more SVC-CVCs serving them locally. Although FIG. 4*b* illustrates SVCS-VDN 900 and SVCS-CVCs 910-1 and 910-2 as single instances, the present invention envisions that they can be distributed. The SVCS-VDN 900 connects to SVCS-CVCs 910-1 and 910-2 through a link 318 on the public Internet, another IP network, a packet network, a combination of a private IP network and public Internet, or a private network. Note that the video server 100 remains the same as that illustrated in FIG. 4*a*.

A sources manager 901 serves the SVCS(s). Each client's receiver application has a virtual set top box (VSTB) 620-1, 620-4, a local application residing at the client's location on the same or different hardware component(s). If the two applications are residing on different hardware, the components can be connected to receiver application 200-1, 200-4 with link 419, which can, for example, be wired Ethernet, WiFi, or Bluetooth. If the VSTB 620-1, 620-4 and receiver application 200-1, 200-4 are running on the same hardware component, link 419 is merely an internal processor connectivity between applications. The VSTB 620-1 residing at client (i.e., Rose) location connects to SVCS-CVC 910-1 through link 418, which is an IP connectivity through the public Internet, another IP network, a packet network, a combination of a private IP network and public Internet, or a private network.

The SVCS-VDN 900 forms one conference and each SVCS-CVC forms another disjoint conference. In doing so, each receiver application 200-1, 200-4 must participate in two conferences simultaneously, that of the SVCS-VDN and that of the receiver application's own SVCS-CVC. The video content feed is completely separate from live user communication. Each co-view conference is essentially a side conference created to accommodate the live interactions between users. Each receiver application can request a video source, e.g., live and/or on demand video source, and a live conferencing with other receiver applications at the same time. In this exemplary embodiment, the signaling messages are constrained to only the co-view conferences, allowing the source video to be distributed efficiently. As a result, a (potentially highly) distributed SVCS-VDN can be allocated to merely distribute source videos, while the CVCs can be handled with a (possibly single, or considerably less distributed) SVCS-CVC.

The difficulty in the "two conferences" scenario is that the receiver applications must simultaneously join more than one conference, and therefore need to maintain bandwidth allocation on two network links. However, in the same or another embodiment, a VSTB can be deployed along with the receiver application to combine the two sessions.

Client 1 requests video content from the video server 100 and a co-view conference through the VSTB 620-1. The VSTB 620-1 forwards the video content request to SVCS-VDN 900 (i.e., the, possibly distributed, SVCS responsible for video distribution). The SVCS-VDN 900 sends the video source back to VSTB 620-1. For the CVC, the VSTB 620-1 joins a new conference on SVCS-CVC 910-1, which will be grafted to the network of SVCS specifically for the formation of the group in CVC.

Each receiver application in the same CVC 910-1 will connect via the VSTB 620-1 with one link 418 (e.g., public Internet or private IP network) to the SVCS-CVC, and with another link 419 (e.g., public Internet or private IP network) to the SVCS-VDN responsible for video source distribution to receive the shared video source. VSTB 620-1 is in essence served by two SVCSs, one for video distribution and one for conferencing. It coordinates the requests for the two conferences and combines and sends them as if a single conference to receiver application 200-1. A benefit of using a network-based VSTB is that it can quickly and optimally adjust the bandwidths of all the sources it handles based on the receiver application bandwidth.

All video sources from the video server 100 are handled by a (possibly distributed) SVCS responsible for propagating the video. The video sources are indexed in the sources manager 901, which provides the appropriate SSRC fields based on each receiver application's video channel request. While FIG. 4*b* illustrates a separate SVCS-VDN and SVCS-CVC, the present invention envisions that the same (possibly distributed) SVCS can perform the dual role.

Figure 4B:
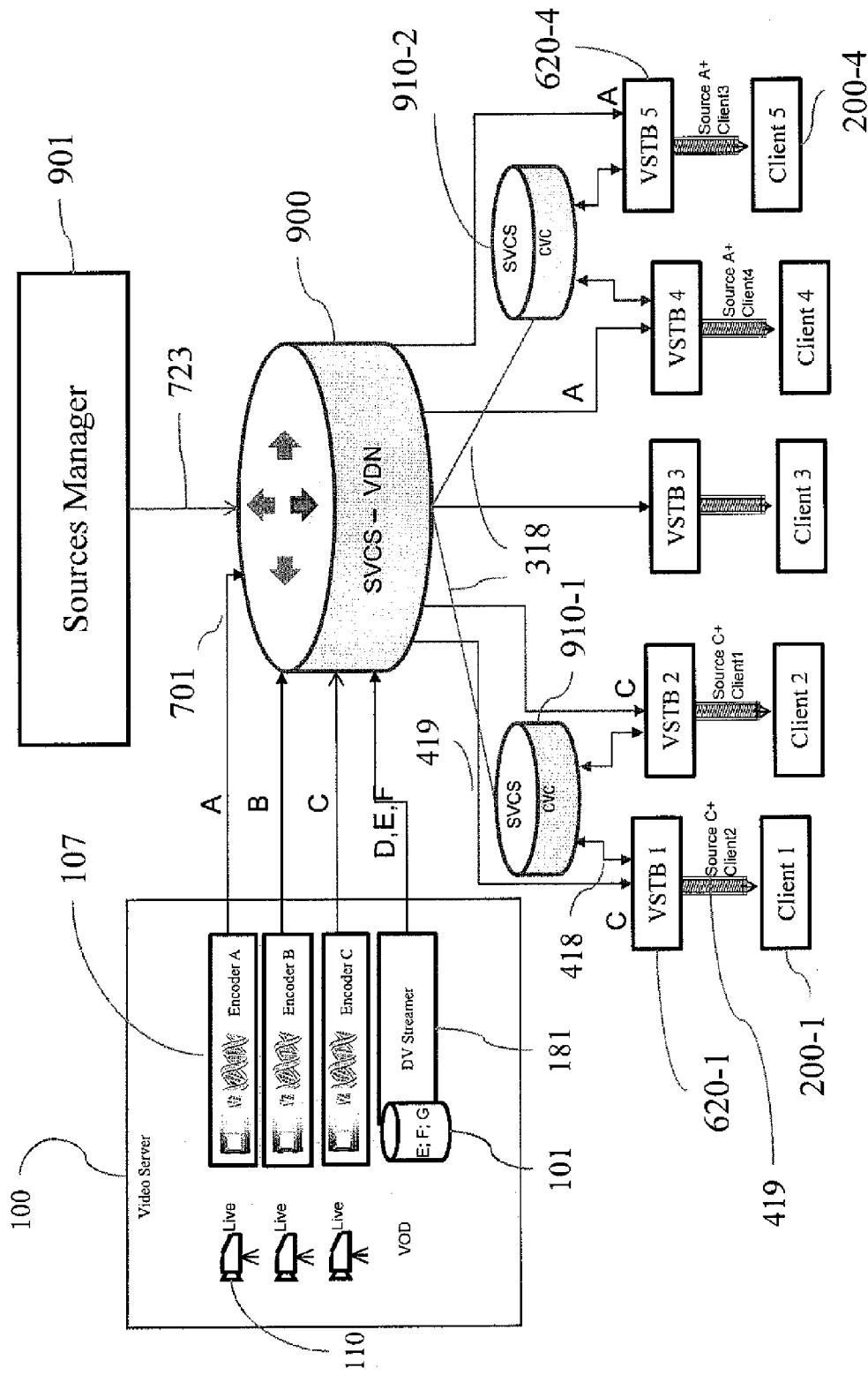
FIG. 4b is a network diagram illustrating an exemplary system for video distribution and video conferencing in accordance with an exemplary embodiment of the present invention.
Figures 1, 4B:
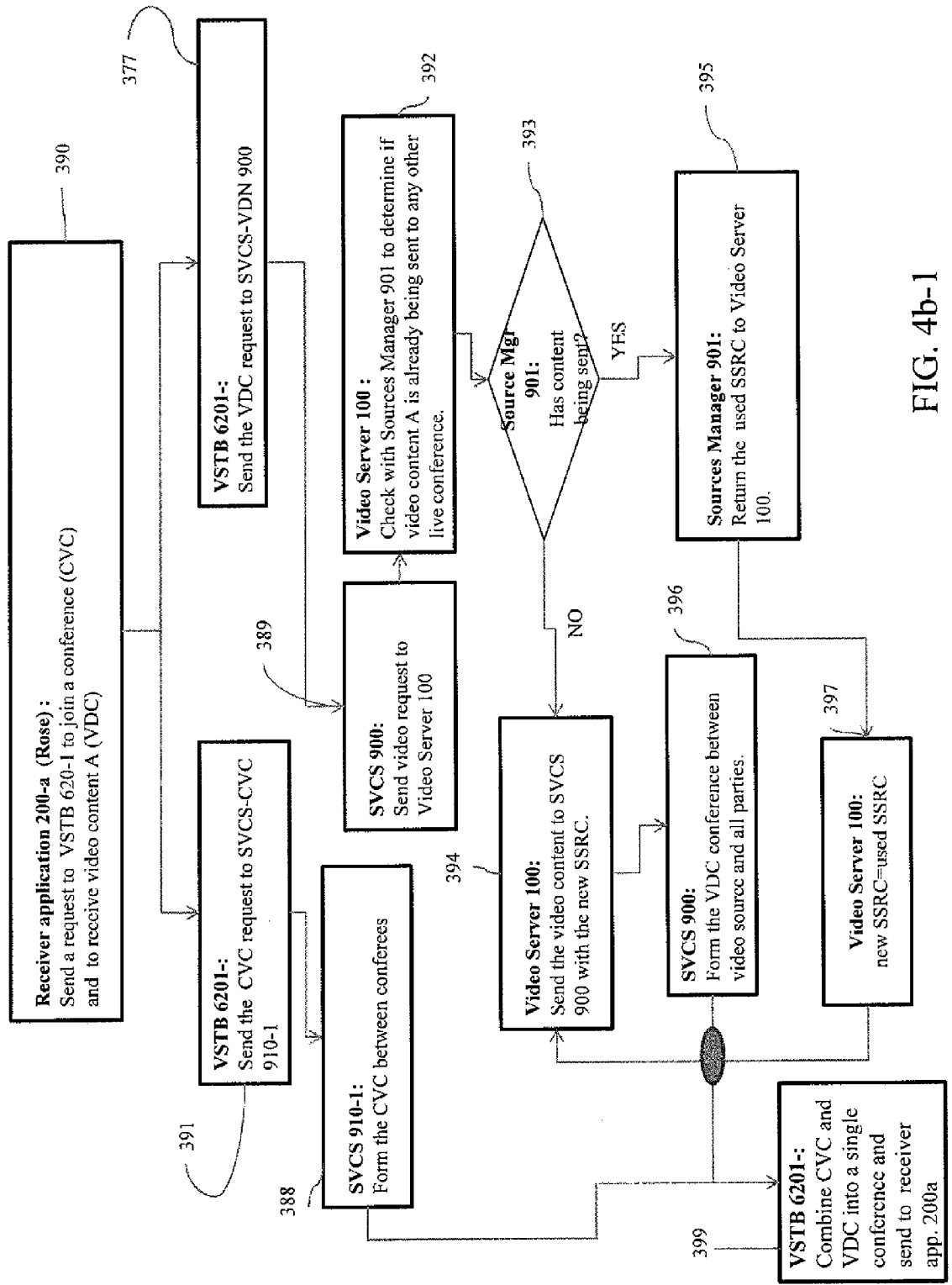

FIG. 4*b*-1 illustrates an exemplary method for providing interactive TV watching where the VSTB joins two conferences to provide a perceived single conference view to the receiving application, as illustrated in FIG. 4*b*. The process starts when the receiver application 200-*a* (i.e., client 1, "Rose") requests to form a conference between herself, John, and James, and receive content A (e.g., a football game).

The receiver application 200-*a* in turn sends 390 the request to the VSTB 620-1. The VSTB 620-1 sends 391 a request to the SVCS-CVC 910-1 to form a CVC between Rose, John, and James, and in parallel, the VSTB 620-1 sends 377 a request to the SVCS-VDN 900 to form a VDN between video content A and Rose, John, and James. The SVCS-900 sends 389 the request to the video server 100. The video server 100 in turn sends 392 a message to the sources manager 901 to check whether the video content A has already being sent to any other conferences.

If the video content is already being sent to another conference, the sources manager 901 returns 395 the SSRC value already being used to the video server 100. The video server 100 then sends 397 the video content A with that SSRC value to SVCS-VDN 900 so that only one copy of the video is sent downstream.

If the sources manager 901 determines 393 that the video content A is not being sent, a new SSRC is created 394 and the video content is sent by the video server 100 to SVCS 900. In turn, SVCS 900 forms 396 a new conference.

Now that VSTB 620-1 is a member of two conferences (CVC and VDN), it combines 399 the two conferences and sends a single conference to the receiver application 200a.

Figure 4C:
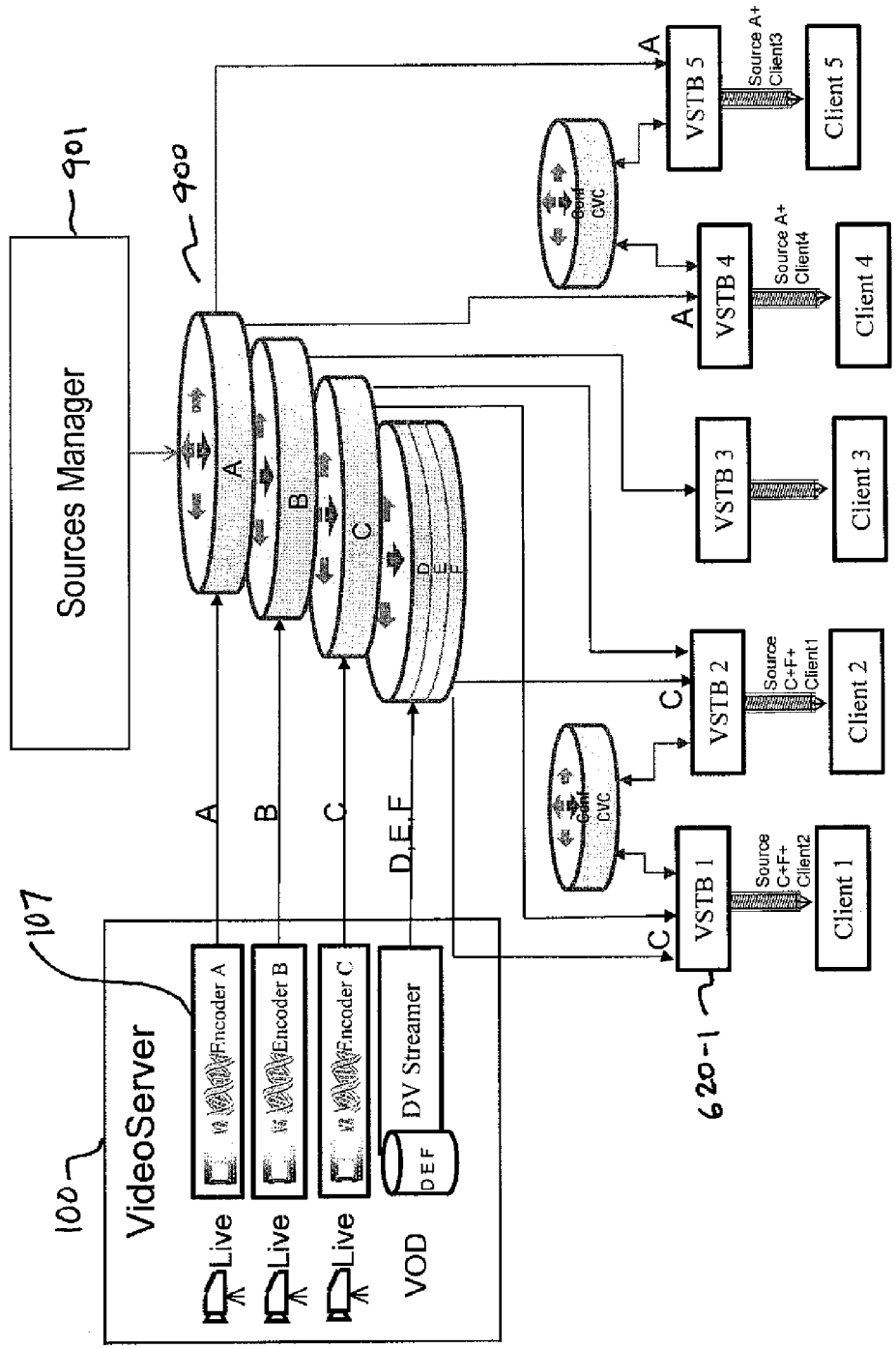
FIG. 4c is a network diagram illustrating an exemplary system for video distribution and video conferencing in accordance with an exemplary embodiment of the present invention.

FIG. 4*c* illustrates an exemplary system for interactive synchronized video watching, which contains a distributed SVCS. For example, separate SVCS VDNs can be employed for video sources 100A, B, C, and D+E+F; the VSTB 620-1 requests the video source from the corresponding SVCS VDN C. The VSTB 620-1 can determine which SVCS VDN serves which video source through the sources manager 901.

Figure 4D:
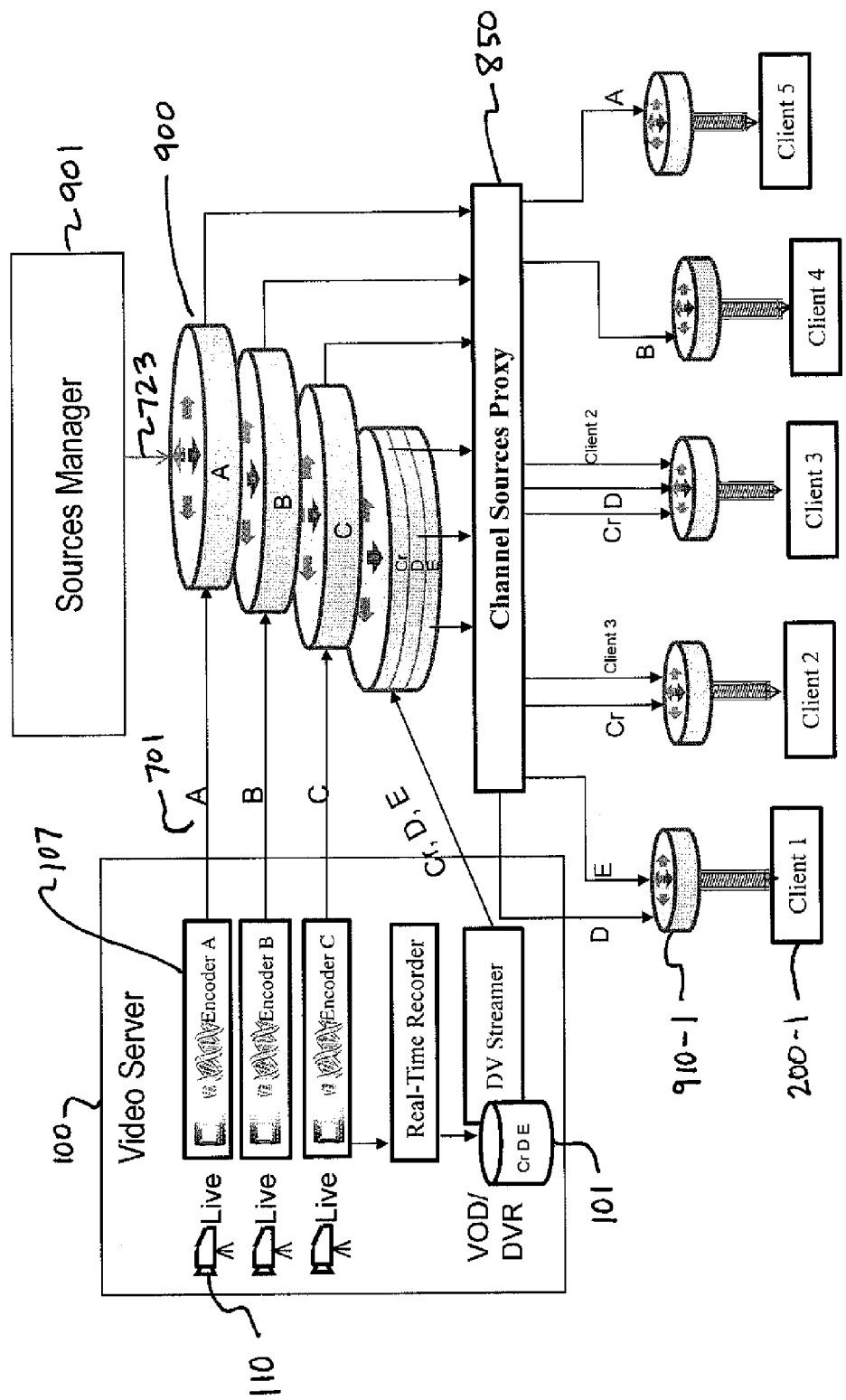
FIG. 4d is a network diagram illustrating an exemplary system for video distribution and video conferencing in accordance with an exemplary embodiment of the present invention.

The "two conferences" embodiment discussed above can be further optimized by using a channel sources proxy (CSP). FIG. 4d illustrates an exemplary conferencing system where each video source feed 107A, 107B, 107C, 107 Cr, D, E is connected to its own (possibly distributed) SVCS 900A, 900B, 900C, 900 Cr, D, E. The functionality of the VSTB is pushed into a proxy 850 that is closer to the feeds' SVCS. Each receiver application 200-1-200-5 is connected to its own conference SVCS 901-1-1-901-1-5 and the requests for the video sources are sent through the sources manager 901 to the CSP 850, which feeds the sources into each receiver application's conference separately.

When a co-view is initiated, all the invited users disconnect from their own conference and join the inviting user's conference, where they can share the video content that the inviting user wants to synchronously view with the invited users. When an invited user disconnects from the co-view conference and re-joins its own conference, the state of the video sources have been saved so that the user can view the video sources he was watching prior to joining the inviting user's conference.

In the same or another embodiment, video server 100 can contain a real-time recorder and digital video recorder (DVR) capability 101, as illustrated in FIG. 4d. The real-time recorder and DVR capability 101 make it possible, for example, to pause or search the streamed source video content for all conferees during a co-view session, which can be initiated by one of the conferees. The users can pause or search any prerecorded video content through the real-time recorder 101 of the video server 100. For example, if one of the conferees pauses the video, the video is shown in "pause-state" to all co-view conferees. Similarly, one of the co-view conferees can search the video content while all other conferees are also put into the "search-state" controlled by the CPS 850.

Figure 4E:
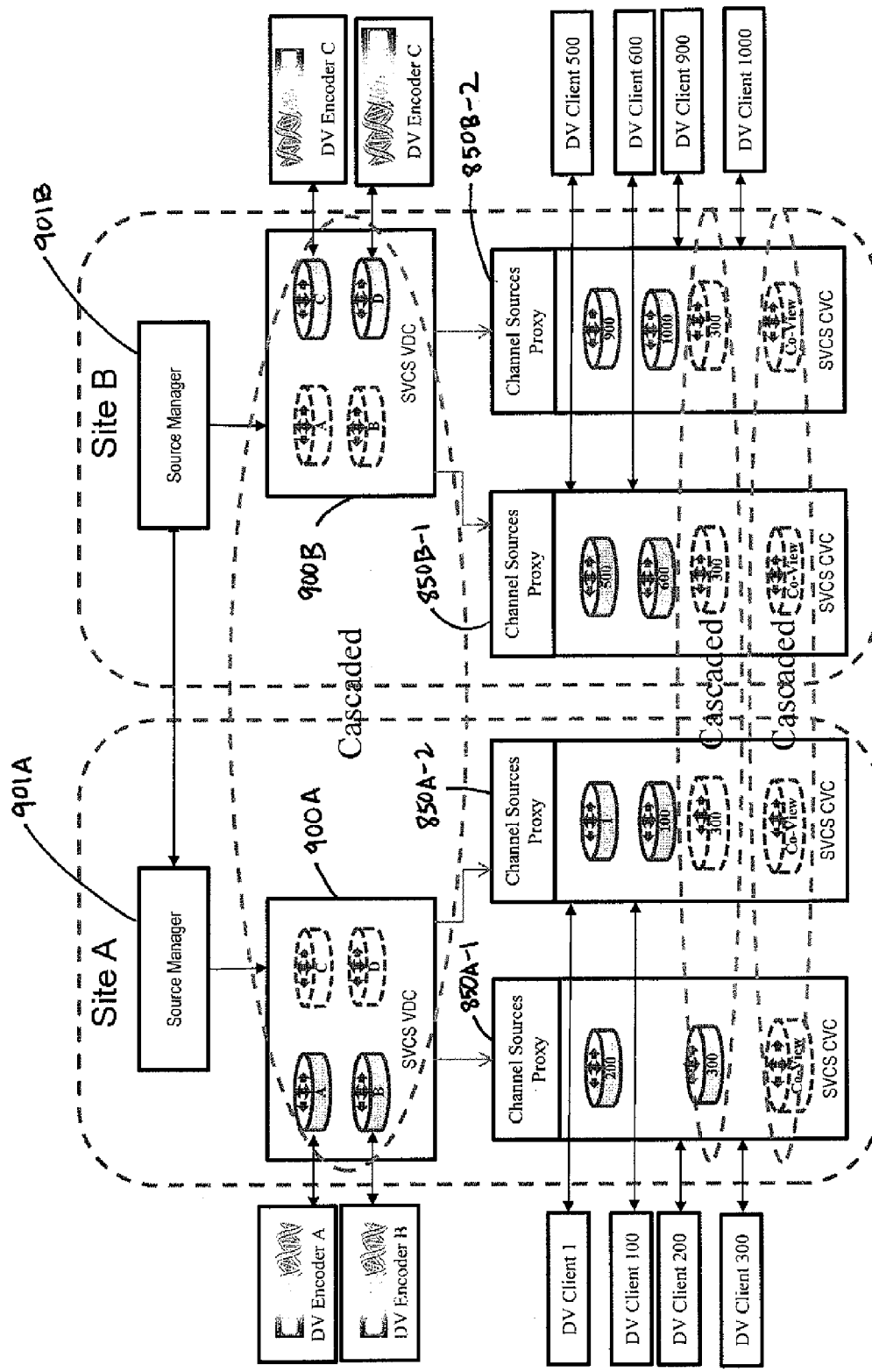
FIG. 4e is a network diagram illustrating an exemplary system for video distribution and video conferencing in accordance with an exemplary embodiment of the present invention.

FIG. 4e illustrates another exemplary system for interactive synchronized video watching that contains two conferences with CSPs (850A-1, 850A-2, 850B-1, 850B-2), wherein the CSPs are using a distributed SVCS (900A, 900B). The CSPs implemented at the source video side as well as the receiver side provide further routing efficiencies. This exemplary embodiment reduces the amount of messaging per video source and allows better resource allocation. While FIGS. 4a-4e illustrate several exemplary systems for interactive synchronized video watching using SVCS architecture, many variations (by applying, for example, DVR functionality, pause/search functions) are possible.

Figure 5:
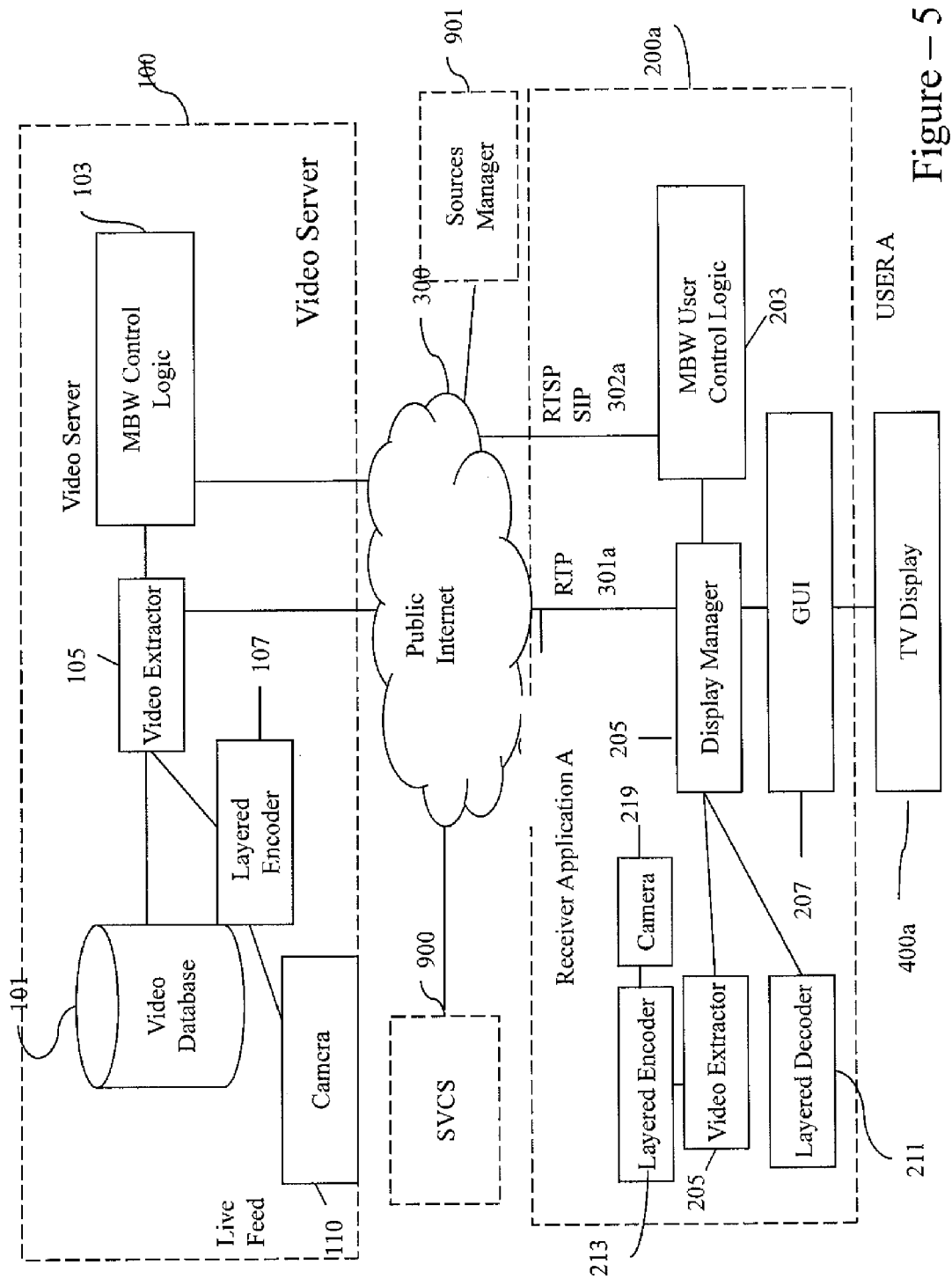
FIG. 5 is a block diagram illustrating an exemplary system for video distribution and video conferencing in accordance with an exemplary embodiment of the present invention.

FIG. 5 illustrates an exemplary video server 100 and receiver application (e.g., receiver application 200a, 200b, or 200c). The video server 100 contains a video database 101, which stores videos (e.g., encoded video programs or movies), MBW control logic 103, which processes information received from receiver application 200a (e.g., that the user wants to switch the video displayed in the main screen with the video displayed an MBW), and video extractor 105, which extracts appropriate special/temporal bitstreams from video database 101 to instantly transmit to receiver application 200a the requested video based on a user's MBW choice. The video extractor 105 can also extract bit streams directly from layered encoder 107 to show live feeds (i.e., video content not stored in the video database).

The network 300 (for example, the public Internet, another IP network, a packet network, a combination of a private IP network and public Internet, or a private network) contains SVCS 900 and a sources manager 901. The sources manager 901 allows appropriate indexing of video sources in the network and governs the logic that determines how the SVCS serves which video source most optimally.

The receiver application 200a contains MBW user control logic 203, which communicates with the MBW control logic of both video server 100 (i.e., MBW control logic 103) and other receiver applications, over the public Internet 300 using link 302a (using a protocol such as RTSP, HTTP) to handle assignment of conferee to an MBW. MBW user control logic 203 handles the user preferences and assignments of conferees to be displayed in each MBW. Conferees can be assigned to an MBW statically, automatically (by the system), or manually (by the user, e.g., drag and drop a user from address book into an MBW). Although not shown in FIG. 5, the present invention envisions that there will be an address book or presence based buddy list application associated with the conferencing application logic contained in display manager 205 to allow conference set-up. The display manager 205 also establishes a dialog with the sources manager 901. The display manager 205 also processes the user's display settings and MBW preferences to configure the display panel.

The user can use the GUI 207 to invoke actions on the display manager 205, for example, to select window size for each MBW (e.g., first MBW=QCIF, second MBW=QCIF, third MBW=CIF), specify the location of each MBW on the video display 400a (e.g., align top, bottom or side of the screen), etc.

The receiver application 200a contains a layered encoder 213 and camera 219 to capture the video of the user, and sends the audio and video to the SVCS 900. The receiver application 200a also contains a layered decoder 211 to decode other users' audio and video as well as the video content coming from the video server 100, and video extractor 205 to extract the appropriate layers of the encoded bit stream.

The receiver application 200a is functionally similar to the video server 100, as the video server can be considered a "one-way" conferencing user. However, the only difference between the two is the video database 101 that can be contained in the video server 100, as well as additional auxiliary functionality necessary to perform the network delay equalization, if necessary, which are not shown in FIG. 5.

Figure 6:
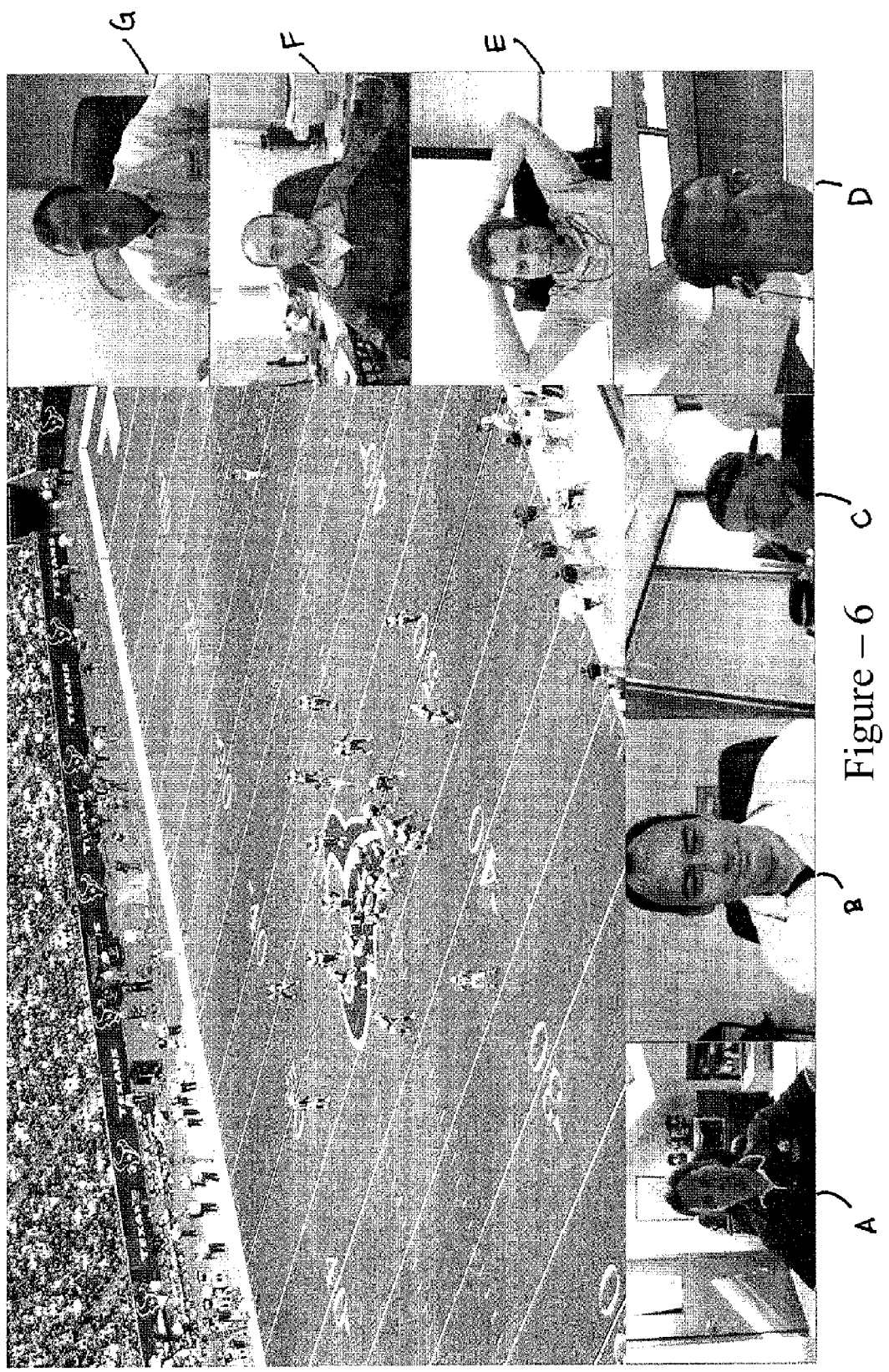
FIG. 6 is an exemplary video display screen in accordance with the present invention.

FIG. 6 illustrates an exemplary video display in a system for interactive synchronized video watching as described above. In one exemplary embodiment, a plurality of users can synchronously co-view a football channel while conferencing between the users. One user can, for example, configure his display to show the football channel on the main screen (400-M), and display seven other users (A-G) in overlay MBWs (A, B, C, D, E, F, G) aligned at the bottom and right-hand side of the video display.

Each user can see and hear the others as in a conferencing system, and simultaneously see and hear the football game. The video in the main window (400-M) is comprised of the base layer and enhancement layers of the encoded video. The conferencing video of the users in the MBWs (A-G) is comprised of only the base layer, and therefore consumes only a fraction of the bandwidth needed for a full resolution video. The video content displayed in the main screen (400-M) can be switched with conferencing video displayed in a MBW. However, when the main screen content is switched to an MBW, only the video content's base layer is transmitted, which makes room for transmitting the enhancement layers of the user's video that is switched to the main window. View layout management techniques specifically design for systems that employ scalable video are described in co-pending provisional U.S. Patent Application Ser. No. 61/060,072.

Although the techniques described here apply to any generic digital video distribution system, and in particular to systems using packet networks (e.g., IPTV) and public Internet (e.g., video services available on the Internet), the disclosure is focused on IPTV. Application of the invention to other digital video distribution systems can be achieved through trivial modifications and terminology changes.

We claim:

1. A method for receiving interactive synchronized video, comprising:
   (a) receiving at least one video content coded in a scalable video coding format from at least a first Scalable Video Conferencing Switch (SVCS), wherein the scalable video coding format comprises at least a base layer and at least one enhancement layer;
   (b) receiving at least one conferencing content coded in a scalable video coding format from a second SVCS, wherein the scalable video coding format comprises at least a base layer and at least one enhancement layer;
   (c) synchronizing at the receiver the at least one video content and the at least one conferencing content; and
   (d) displaying simultaneously, on a video display, the reconstructed video content and the reconstructed conferencing content in a plurality of windows comprising at least one main window and at least one mini browsing window (MBW); wherein the reconstructed content displayed in the main windows is reconstructed from the at least a base layer and the at least one enhancement layer, and the content displayed in the MBWs is reconstructed from the at least one base layer only;
   wherein the synchronizing at the receiver between the at least one video content and the at least one conferencing content further comprises a determination of a need for delay equalization, and when the need for delay equalization is determined, further comprises delay equalization between at least a base layers of the conferencing content and a base layer and at least one enhancement layer of the video content.

2. The method of claim 1, wherein the first SVCS and the second SVCS are the same physical device.

3. The method of claim 1, wherein the at least one video content comprises video content coded using low delay coding.

4. The method of claim 1, wherein the at least one conferencing content comprises conferencing content coded using low delay coding.

5. The method of claim 1, wherein the receiving at least one video content comprises receiving video content distributed in a video distribution conference (VDC).

6. The method of claim 1, wherein the receiving at least one at least one conferencing content comprises receiving conferencing content distributed in a co-view-conference (CVC).

7. The method of claim 1, wherein the receiving comprises receiving a first conferencing content by a first participant distributed in a first CVC, and a second conferencing content by a second participant distributed in a second CVC.

8. The method of claim 7, further comprising sending one or more communications using a non-standard signaling protocol between the first participant and the second participant.

9. The method of claim 1, wherein the conferencing content is specified by a globally unique identifier.

10. The method of claim 9, wherein the globally unique identifier is conveyed in an SSRC field (located in a RTP header).

11. The method of claim 1, wherein at least part of the conferencing content is received from the first SVCS.

12. The method of claim 1, further comprising, in response to a user's request, switching the content displayed in the main window with the content displayed in one of the MBWs, wherein the switching comprises transmitting the enhancement layer of the content being switched into the main window and ceasing transmission of the enhancement layer being switched into the MBW.

* * * * *